United States Patent
Xu et al.

(10) Patent No.: US 7,995,661 B2
(45) Date of Patent: Aug. 9, 2011

(54) SYSTEMS AND METHODS FOR CONSERVING THE POWER SUPPLY OF A COMMUNICATIONS DEVICE

(75) Inventors: Shugong Xu, Vancouver, WA (US); Kimihiko Imamura, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1029 days.

(21) Appl. No.: 11/838,030

(22) Filed: Aug. 13, 2007

(65) Prior Publication Data

US 2009/0046789 A1    Feb. 19, 2009

(51) Int. Cl.
  *H04K 1/10*    (2006.01)
(52) U.S. Cl. ........................................ 375/260
(58) Field of Classification Search ............... 375/260, 375/342, 358
  See application file for complete search history.

(56) References Cited

U.S. PATENT DOCUMENTS

| | | | |
|---|---|---|---|
| 7,426,190 B2* | 9/2008 | Manjeshwar et al. | 370/254 |
| 7,725,796 B2* | 5/2010 | Ihm et al. | 714/751 |
| 2007/0160003 A1 | 7/2007 | Meier | |
| 2007/0177569 A1 | 8/2007 | Lundby | |

OTHER PUBLICATIONS

3GPP TSG-RAN Submission R2-072599, "DRX Procedure for VoIP," Jun. 2007.
3GPP TSG-RAN Submission R2-072777, "Semi-persistent Scheduling and DRX Control," Jun. 2007.
3GPP TSG-RAN Submission R2-072604, "DRX handling in mixed case," Jun. 2007.
3GPP TS 36.300 V8.1.0, "Evolved Universal Terrestrial Radio Access (E-UTRA) and Evolved Universal Terrestrial Radio Access Network (E-UTRAN)," Jun. 2007.

* cited by examiner

*Primary Examiner* — Kevin Y Kim
(74) *Attorney, Agent, or Firm* — Austin Rapp & Hardman (57) ABSTRACT

A method for conserving the power supply of an Orthogonal Frequency Division Multiplexing (OFDM) communications device is described. The location of a bit of information within one of a plurality of symbols is obtained. A sleep mode is entered into. The one symbol that includes the bit of information is monitored. A return to the sleep mode is executed.

18 Claims, 9 Drawing Sheets

SYSTEMS AND METHODS FOR CONSERVING THE POWER SUPPLY OF A COMMUNICATIONS DEVICE

TECHNICAL FIELD

The present disclosure relates generally to communications and wireless communications systems. More specifically, the present disclosure relates to systems and methods for conserving the power supply of a communications device.

BACKGROUND

The 3rd Generation Partnership Project, also referred to as "3GPP," is a collaboration agreement that aims to define globally applicable Technical Specifications and Technical Reports for 3rd Generation Systems. 3GPP Long Term Evolution (LTE) is the name given to a project to improve the Universal Mobile Telecommunications System (UMTS) mobile phone or device standard to cope with future requirements. The 3GPP may define specifications for the next generation mobile networks, systems, and devices. In one aspect, UMTS has been modified to provide support and specification for the Evolved Universal Terrestrial Radio Access (E-UTRA) and Evolved Universal Terrestrial Radio Access Network (E-UTRAN).

Mobile devices are commonplace in today's society. Such devices typically require power, such as from a battery, to run. Considering that the typical battery life is limited, ways of efficiently utilizing this limited resource, as well as providing good user experience are desirable. In defining the specification, one of the goals of E-UTRA and E-UTRAN is to provide power-saving possibilities on the side of the user device, whether such device is in the idle or active mode.

Often, during an idle mode, mobile devices unnecessarily use power to monitor certain data transmissions. These data transmissions may not include data that the mobile device needs or desires. As such, power of the mobile device may be conserved if the mobile device monitored the transmissions that included necessary data and did not monitor data transmissions that are unnecessary to the mobile device. Accordingly, benefits may be realized from systems and methods that conserve the power supply of the mobile device so that the mobile device is able to function for a longer time period.

DETAILED DESCRIPTION

A method for conserving the power supply of an Orthogonal Frequency Division Multiplexing (OFDM) communications device is described. The location of a bit of information within one of a plurality of symbols is obtained. A sleep mode is entered into. The one symbol that includes the bit of information is monitored. A return to the sleep mode is executed.

The bit of information may be an acknowledgment/non-acknowledgment (ACK/NAK) bit. The plurality of symbols may be OFDM symbols. A determination as to whether a silence period on a downlink of the communications device has started. A time period information is received to enable monitoring each of the plurality of symbols.

In one embodiment, the OFDM communications device remains in an awake mode to monitor each of the plurality of symbols based on the time period information. The time period may be less than 160 milliseconds. The location of the bit of information within one of a plurality of symbols may be transmitted by an Evolved NodeB to the OFDM communications device.

A communications device in an Orthogonal Frequency Division Multiplexing (OFDM) system that is configured to conserve its power supply is also described. The device includes a processor and memory in electronic communication with the processor. Instructions are stored in the memory. The location of a bit of information within one of a plurality of symbols is obtained. A sleep mode is entered into. The one symbol that includes the bit of information is monitored. A return to the sleep mode is executed.

A base station that is configured to inform a communications device the location of a bit of information is also described. The base station includes a processor and memory in electronic communication with the processor. Instructions are stored in the memory. N Orthogonal Frequency Division Multiplexing (OFDM) symbols are provided to send an acknowledgment/non-acknowledgment (ACK/NAK) bit per subframe. N is a natural number. The ACK/NAK bit for the communications device is inserted into one of the OFDM symbols. The communications device is informed which OFDM symbol includes the ACK/NAK bit.

In one embodiment, Radio Resource Control (RRC) signaling is used to inform the communications device which OFDM symbol includes the ACK/NAK bit. The OFDM symbols may transmit a Physical Downlink Control Channel (PDCCH), a Physical Hybrid Automatic Request Indicator Channel (PHICH) and a Physical Control Format Indicator Channel (PCFICH).

A computer-readable medium comprising executable instructions is also described. The location of a bit of information within one of a plurality of Orthogonal Frequency Division Multiplexing (OFDM) symbols is obtained. A sleep mode is entered into. The one symbol that includes the bit of information is monitored. A return to the sleep mode is executed.

Several exemplary embodiments are now described with reference to the Figures. This detailed description of several exemplary embodiments, as illustrated in the Figures, is not intended to limit the scope of the claims.

The word "exemplary" is used exclusively herein to mean "serving as an example, instance or illustration." Any embodiment described as "exemplary" is not necessarily to be construed as preferred or advantageous over other embodiments.

As used herein, the terms "an embodiment," "embodiment," "embodiments," "the embodiment," "the embodiments," "one or more embodiments," "some embodiments," "certain embodiments," "one embodiment," "another embodiment" and the like mean "one or more (but not necessarily all) embodiments," unless expressly specified otherwise.

The term "determining" (and grammatical variants thereof) is used in an extremely broad sense. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

Conserving power for mobile devices, such as mobile user equipment (UE), is desirable for Long Term Evolution (LTE) communications systems. In general, the principle of saving the power of a UE is to maximize the radio non-reception time (periods of silence) and transmit less during radio reception time (periods of activity). In LTE systems, Voice over Internet Protocol (VoIP) may be used to carry voice packets from one UE to another device. Unique characteristics of VoIP provide an improvement to the systems and methods for saving the power supply of UEs.

In one embodiment, two types of VoIP packets exist for two distinct periods: a talking period and a silence period. During the talking period, voice packets are transmitted from the UE every 20 milliseconds (ms), while during the silence period, silence insertion description (SID) packets arrive at the UE once every 160 ms.

Existing power saving techniques do not utilize features of VoIP to conserve the power of the UE. The unique feature of VoIP is the correlation between a downlink (DL) transmission pattern and an uplink (UL) transmission pattern. DL transmissions may refer to the transmissions sent from a base station, such as an Evolved NodeB (eNB), to the UE. UL transmissions may refer to the transmissions sent from the UE to the eNB. The correlation between DL transmission patterns and UL transmission patterns is especially relevant during an UL talking period. In other words, when the UE is transmitting voice packets on the UL to the eNB.

In one embodiment, VoIP traffic includes two-way communication traffic. When a user of a UE talks, the UE is in the UL talking period, transmitting voice packets every 20 ms on the UL. While the UE is in the UL talking period, the UE is also in a DL silence period. During the UL talking period, the UE does not stop listening to the DL even though there is no VoIP data transmission on the DL because the UE is in a DL silence period. The UE needs to constantly listen to the DL transmission in order to receive Acknowledgment/Non-Acknowledgment (ACK/NAK) information indicating whether or not the transmitted voice packets were received. In one embodiment, the ACK/NAK is one bit of information that is included in an Orthogonal Frequency Division Multiplexing (OFDM) symbol that indicates whether or not transmitted voice packets were received by the eNB on the UL.

Currently, during a UL talking period (also referred to as an "On" period), the UE needs to receive three OFDM symbols which include a Physical Downlink Control Channel (PDCCH), a Physical Hybrid Automatic Request Indicator Channel (PHICH) and a Physical Control Format Indicator Channel (PCFICH) per subframe in the DL. The UE receives these three OFDM symbols in each transmission time interval (TTI) during the "On" period. Power for the UE may be wasted because the UE is constantly monitoring three OFDM symbols in order to receive one bit of information (the ACK/NAK). Allowing the UE to monitor one OFDM symbol that includes the ACK/NAK, instead of three OFDM symbols, conserves the power supply of the UE. In LTE, subframe has the same meaning of TTI. Each subframe has a length of 1 ms.

Figure 1:
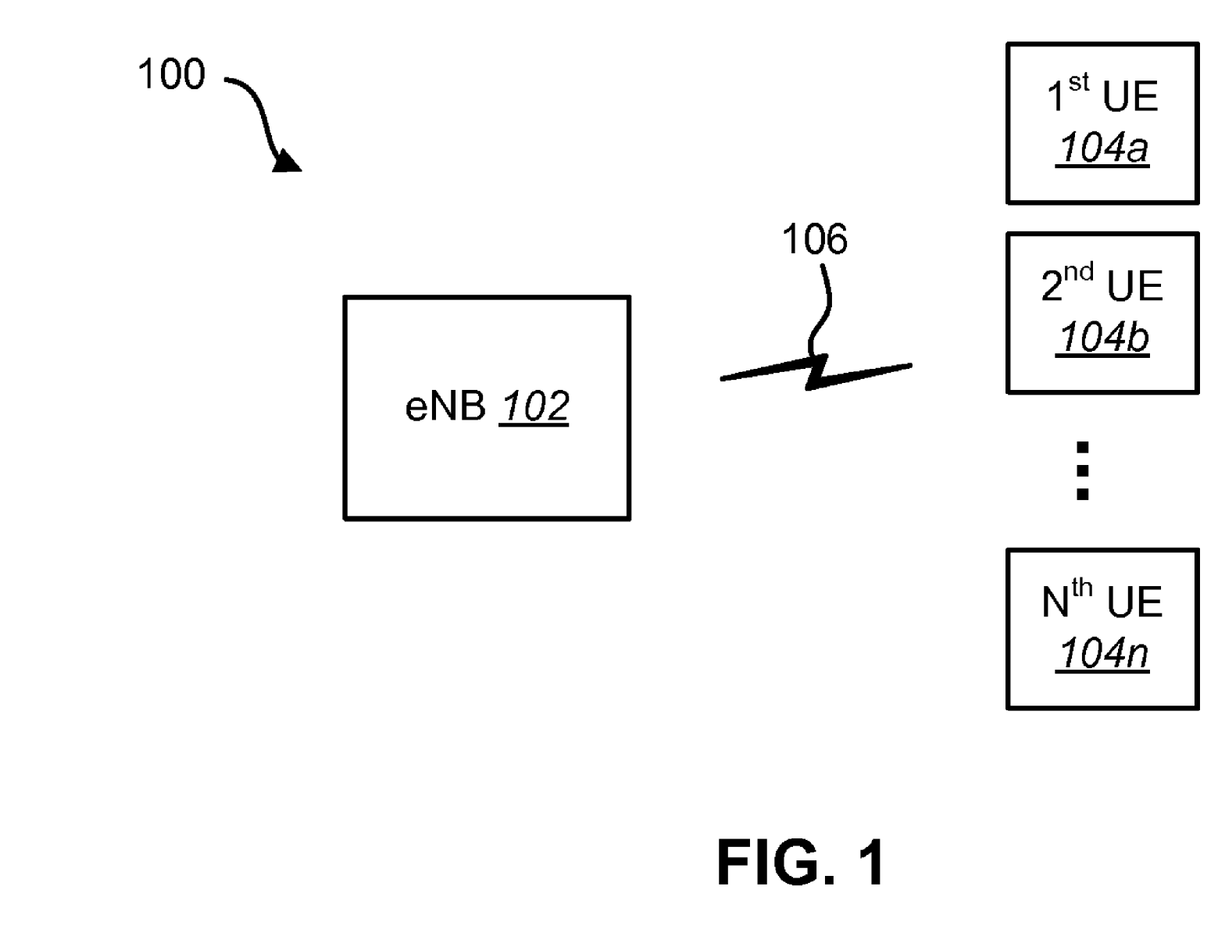
FIG. 1 illustrates an exemplary wireless communication system in which embodiments may be practiced.

FIG. 1 illustrates an exemplary wireless communication system 100 in which embodiments may be practiced. An Evolved NodeB (eNB) 102 is in wireless communication with one or more pieces of mobile user equipment (UE) 104 (which may also be referred to as mobile stations, user devices, communications devices, subscriber units, access terminals, terminals, etc.). The eNB 102 may also be referred to as a base station. The eNB 102 may be a unit adapted to transmit to and receive data from cells. In one embodiment, the eNB 102 handles the actual communication across a radio interface, covering a specific geographical area, also referred to as a cell. Depending on sectoring, one or more cells may be served by the eNB 102, and accordingly the eNB 102 may support one or more mobile UEs 104 depending on where the UEs are located. In one embodiment, the eNB 102 provides a Long Term Evolution (LTE) air interface and performs radio resource management for the communication system 100.

A first UE 104*a*, a second UE 104*b*, and an Nth UE 104*n* are shown in FIG. 1. The eNB 102 transmits data to the UEs 104 over a radio frequency (RF) communication channel 106. The transmitted data may include a plurality of LTE frames. Each of the LTE radio frames may have a length of 10 ms.

Figure 2:
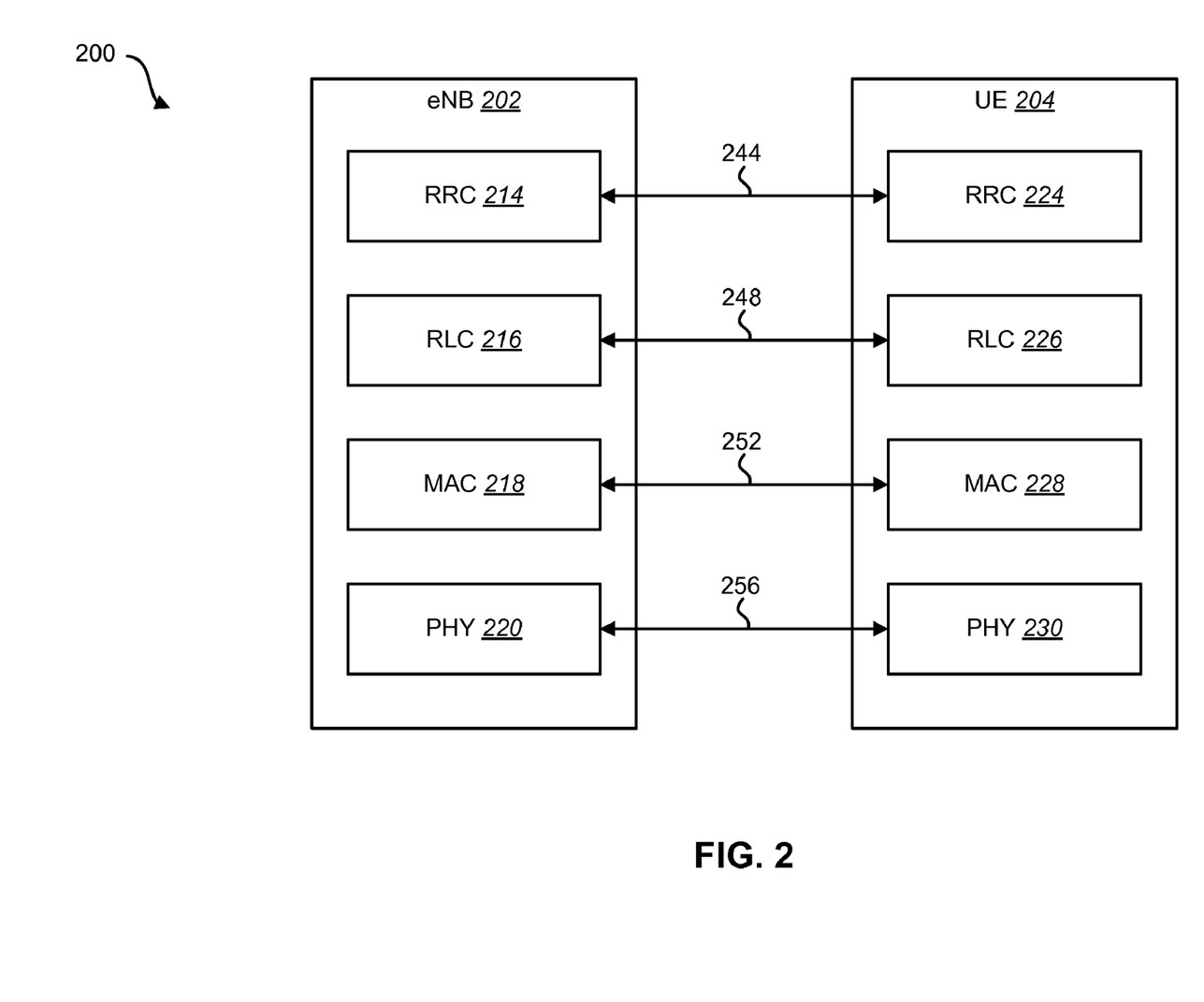
FIG. 2 is a high-level block diagram of exemplary control protocol stacks of a base station, such as an Evolved NodeB (eNB), and a user equipment (UE)

FIG. 2 is an exemplary diagram 200 of a portion of the protocol stack for the control plane of a UE 204 and an eNB 202. The exemplary protocol stacks provide a radio interface architecture between the eNB 202 and the UE 204. In one embodiment, the control plane includes a Layer 1 stack that includes a physical (PHY) layer 220, 230, a Layer 2 stack that includes a medium access control (MAC) 218, 228 layer, and a Radio Link Control (RLC) layer 216, 226, and a Layer 3 stack that includes a Radio Resource Control (RRC) layer 214, 224.

The RRC layer 214, 224 is generally a Layer 3 radio interface adapted to provide information transfer service to the non-access stratum. The RRC layer of the present systems and methods also transfers the location of Acknowledgement/Non-Acknowledgment (ACK/NAK) information from the eNB 202 to the UE 204, as well as provide RRC connection management.

The RLC 216, 226 is a Layer 2 radio interface adapted to provide transparent, unacknowledged, and acknowledged data transfer service. The MAC layer 218, 228 is a radio interface layer providing unacknowledged data transfer service on the logical channels and access to transport channels. The MAC layer 218, 228 may be adapted to provide mappings between logical channels and transport channels.

The PHY layer 220, 230 generally provides information transfer services to MAC 218, 228 and other higher layers 216, 214, 226, 224. Typically the PHY layer transport services are described by their manner of transport. Furthermore, the PHY layer 220, 230 may be adapted to provide multiple control channels. In one embodiment, the UE 204 is adapted to monitor this set of control channels. Furthermore, as shown, each layer communicates with its compatible layer 244, 248, 252, 256.

Figure 3:
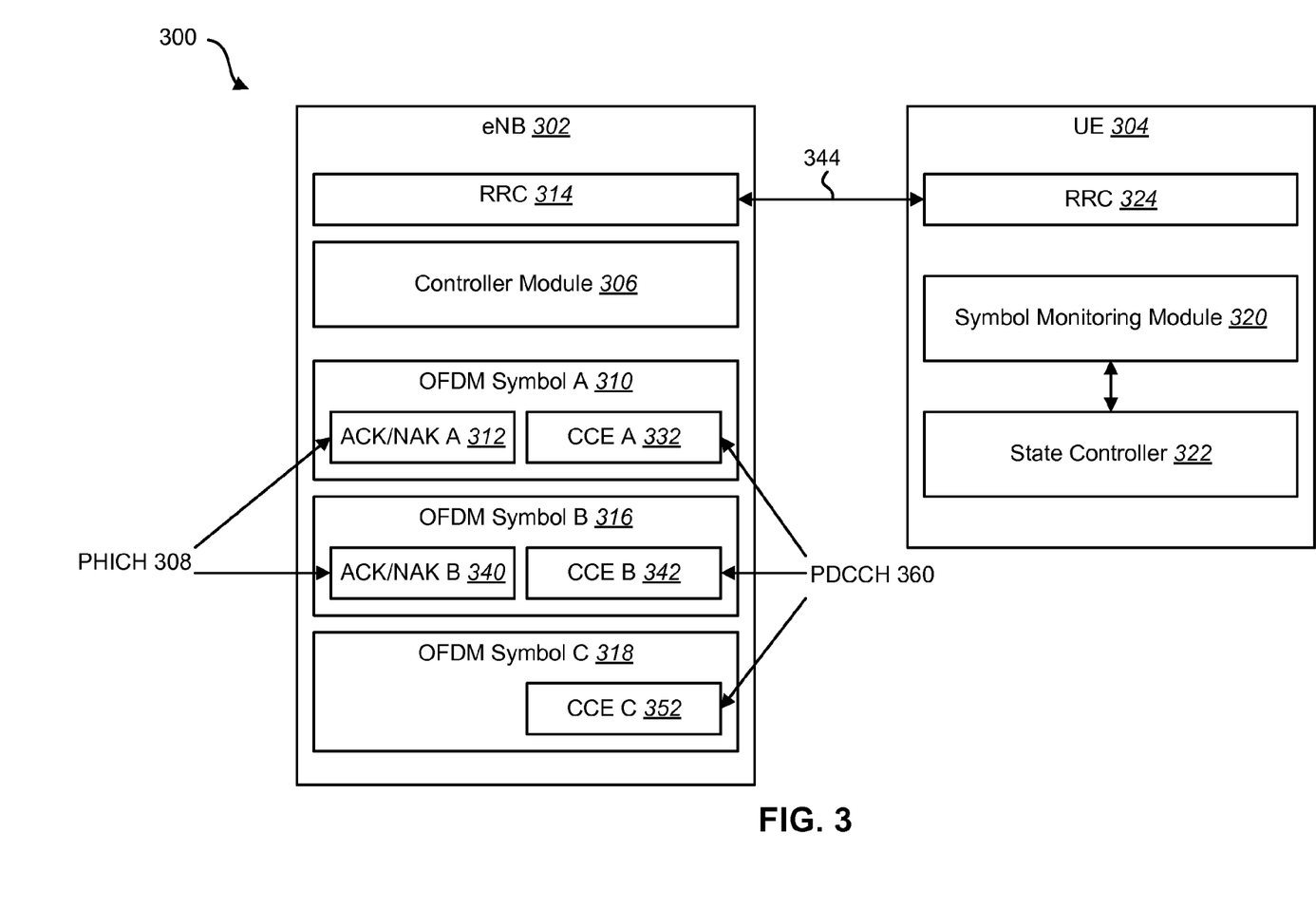
FIG. 3 is a block diagram of one embodiment of an eNB and a UE.

FIG. 3 is a block diagram 300 of one embodiment of an eNB 302 and a UE 304. The eNB 302 may include a controller module 306 that inserts ACK/NAK A 312 bit into OFDM symbol A 310. The controller module 306 may insert ACK/NAK A 312 intended for the UE 304 into a single OFDM symbol, such as OFDM symbol A 310. The controller module 306 may also insert ACK/NAK B 340 intended for a different UE into a different single OFDM symbol, such as OFDM symbol B 316. A PHICH 308 may include several ACK/NAK like ACK/NAK A 312 and ACK/NAK B 340. The PHICH is included in n OFDM symbols. In FIG. 3, n OFDM symbols is three OFDM symbols.

The eNB 302 may indicate the location of ACK/NAK A 312 to the UE 304. In other words, the eNB 302 indicates to the UE 304 which OFDM symbol includes ACK/NAK A 312 bit. In one embodiment, RRC 314 signaling is used to inform the UE 304 of the location of the ACK/NAK. The RRC 314 signaling may be utilized to inform the UE 304 of the location of ACK/NAK A 312 which is included in PHICH 308. The PHICH 308 may include the part of one or more OFDM symbols 310, 316, 318. As illustrated, a single OFDM symbol, such as OFDM symbol A 310, includes ACK/NAK A 312.

In a further embodiment, the RRC 314 signaling may be utilized to inform the UE 304 of a time period in which the UE 304 is to receive a PDCCH included in the n OFDM symbols. The controller module 306 may insert a Control Channel Element (CCE) 332, 342, 352 for the UE 304 into n OFDM symbols, such as OFDM symbols A 316, OFDM symbol B 316 and OFDM symbol C 318. The PDCCH 360 includes several ACK/NAK like ACK/NAK A 312 and ACK/NAK B 340 and PHICH 308 will be included in n OFDM symbols. CCE A 332, CCE B 342 and CCE C 352 may be necessary information for decoding data. CCE 332, 342, 352 include an identification for the UE 304, resource allocation (allocated time and frequency), modulation and coding scheme (MCS), Hybrid Automatic Request (HARQ) information, etc.

The UE 304 also includes the RRC layer 324 and communicates 344 with the corresponding RRC 314 layer of the eNB 302. The UE 304 further includes a symbol monitoring module 320 that monitors symbols received on the PHICH 308 from the eNB 302. In one embodiment, the symbol monitoring module 320 monitors OFDM symbols which include the PHICH 308. The location of the ACK/NAK 312 may be provided to the monitoring module 320. A state controller 322 controls the state of the UE 304. The state may include an awake state or a sleep state. A UE in the sleep state uses less power than a UE in the awake state. The monitoring module 320 may notify the state controller 322 when the OFDM symbol that includes the ACK/NAK 312 is to be received. The state controller 322 may cause the UE to enter the awake state in order to receive the ACK/NAK 312 in the OFDM symbol. The state controller 322 may then cause the UE to enter a sleep state and not monitor other OFDM symbols that may be transmitted to the UE 304. In one embodiment, reducing the number of OFDM symbols that the UE monitors conserves the power supply of the UE 304.

Figure 4:
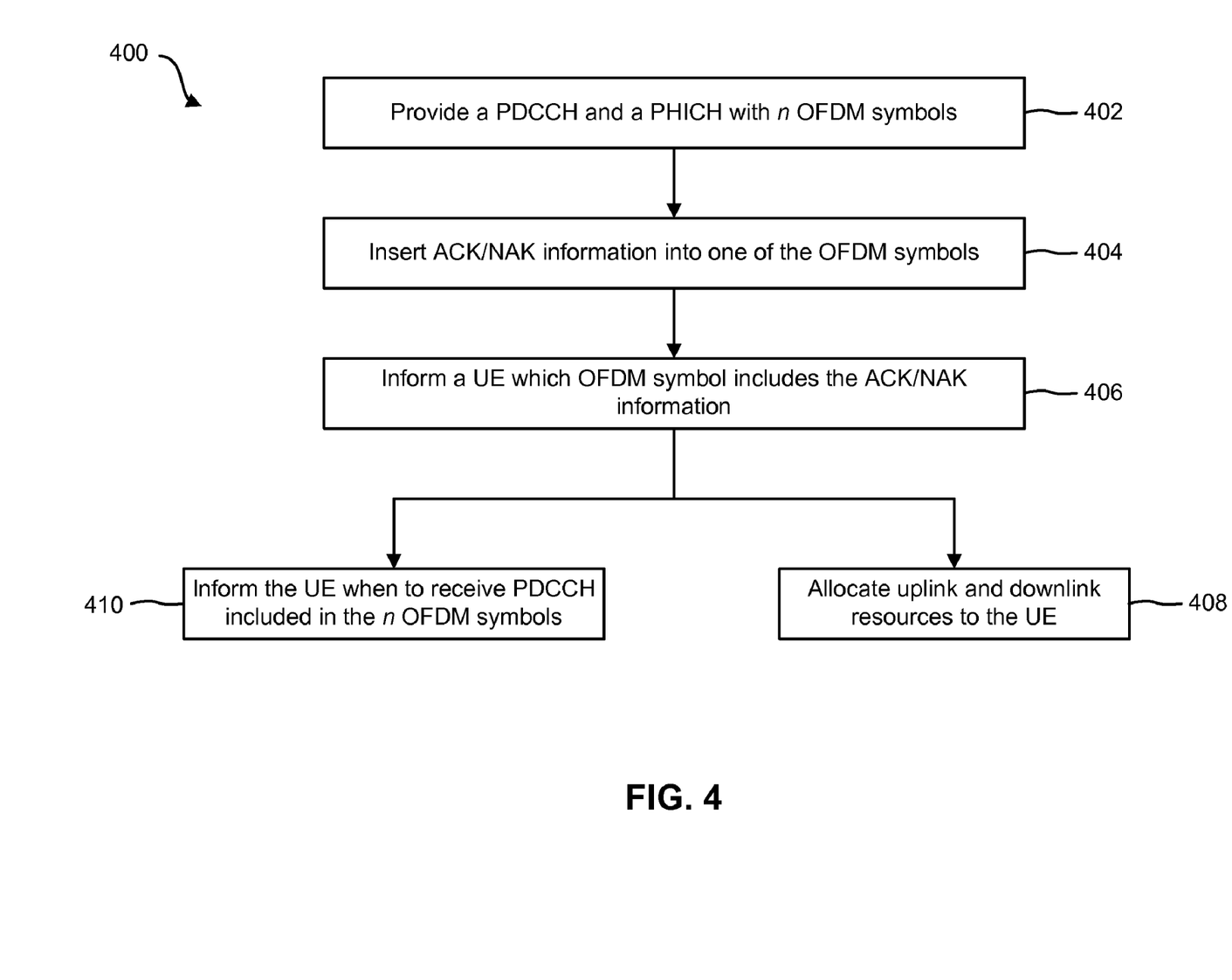
FIG. 4 is a flow diagram illustrating one embodiment of a method for informing a UE the location of an acknowledgment/non-acknowledgment (ACK/NAK) bit.

FIG. 4 is a flow diagram illustrating one embodiment of a method 400 for informing a UE of the location of an ACK/NAK bit. The method 400 may be implemented by the eNB 102. A PDCCH and a PHICH may be provided 402 with n OFDM symbols per subframe. In one embodiment, n is a natural number. The PDCCH and the PHICH may be carried by the OFDM symbols to the UE during a DL silence period of the UE. ACK/NACK information may be inserted 404 into one of the OFDM symbols. In one embodiment, ACK/NAK information is one bit indicating whether or not data transmissions sent from the UE on the UL were received.

The UE may be informed 406 as to which OFDM symbol includes the ACK/NAK information. In addition, UL and DL resources may be allocated 408 to the UE. The location of the ACK/NAK information (i.e., which OFDM symbol includes the ACK/NAK) may be provided to the UE through RRC signaling. Further, the UL and DL resources may be allocated 408 to the UE through RRC signaling. The UE may be informed 406, 408 of the location of the ACK/NAK information as well as the allocated UL and DL resources during a VoIP call setting-up phase. The call setting-up phase may be the phase during which the UE is registering with the eNB before transmissions are sent or received.

In a further embodiment, the UE is informed 410 of a time period in which the UE is to receive PDCCH included in the n OFDM symbols. In other words, a period is defined in which the UE receives all the OFDM symbols regardless if the OFDM symbol includes the ACK/NACK information. This ensures that the UE does not miss any DL non-voice transmissions, such as an occasional IP packet that is sent on the DL during a DL silence period. The time period may not be longer than 160 ms, which is the time between two SID packets. During VoIP call periods, the occasional IP packet that is received may not be time-critical. In other words, voice related signaling may occur before a VoIP traffic stream starts.

The sleep state mentioned above may be referred to as a pico-sleep state. The pico-sleep state may be the state the UE is in when only the ACK/NAK information is retrieved (i.e., the UE only monitors one OFDM symbol). During a duration of 40 ms, the UE may be in the pico-sleep state every other 20 ms to receive only the ACK/NAK information. The RRC signaling of the eNB may be used to inform the UE of the duration of the pico-sleep state.

Figure 5:
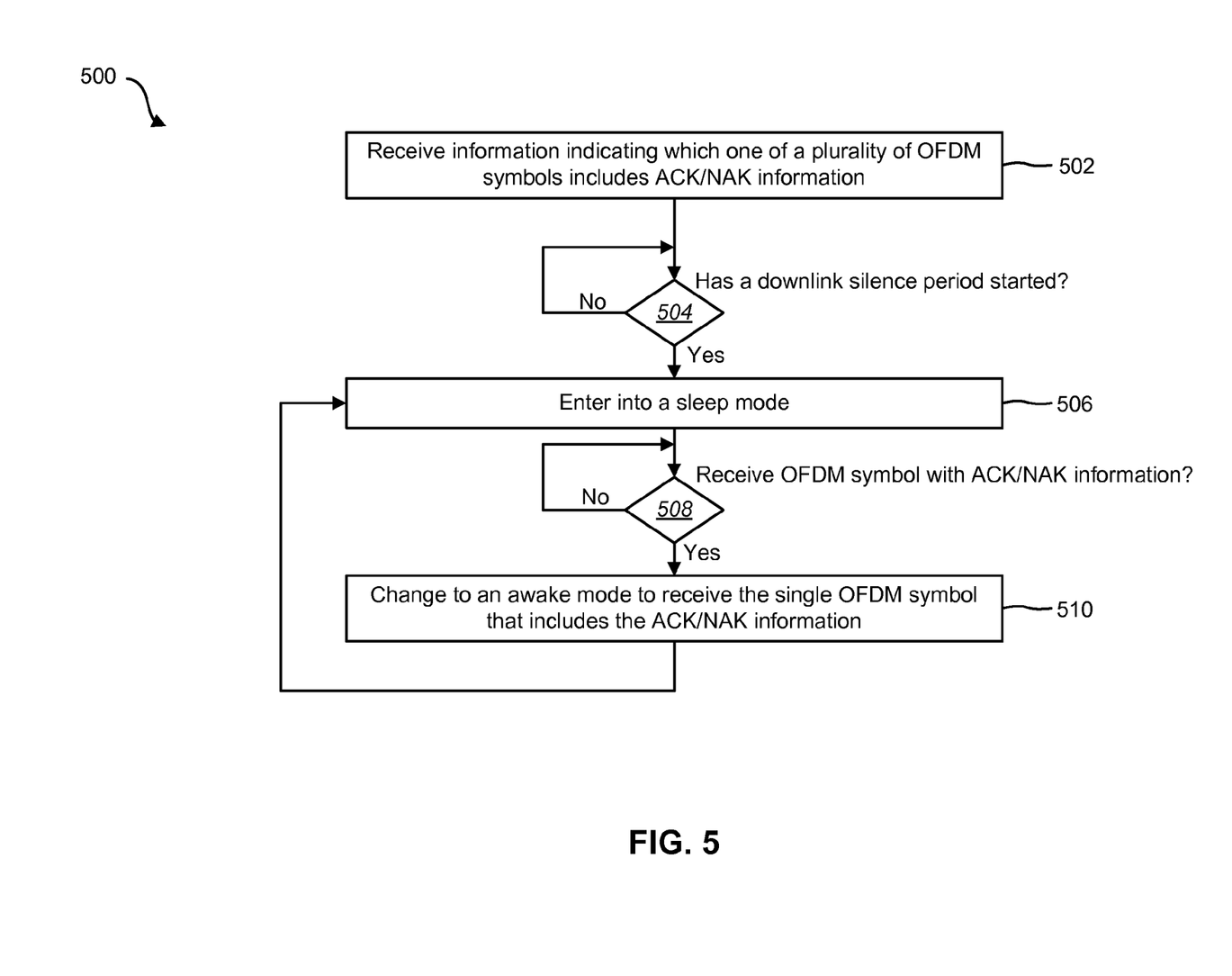
FIG. 5 is a flow diagram illustrating one embodiment of a method for conserving the power supply of a user device.

FIG. 5 is a flow diagram illustrating one embodiment of a method 500 for conserving the power supply of a user device. In one embodiment, the user device is a UE and the method 500 may be implemented by the UE. The method 500 may be implemented during a DL silence period. Information may be received 502 that indicates which one of a plurality of OFDM symbols includes ACK/NAK information.

A determination 504 is made as to whether a DL silence period has started. If the DL silence period has not started, the method 500 enters a repeating loop until the DL silence period has begun. After the DL silence period has started, the UE enters 506 into a sleep mode. The sleep mode may include powering down the majority of applications and functions available on the UE. The sleep mode is utilized to consume a minimum amount of power from the power source of the UE. A determination 508 is made as to whether the OFDM symbol that includes the ACK/NAK information is received. If the OFDM symbol with the ACK/NAK is not received, the UE remains in the sleep mode. When the OFDM symbol that includes the ACK/NAK is received, the UE changes 510 to an awake mode in order to receive the single OFDM symbol and ACK/NAK information. Once the UE receives the ACK/NAK information, the UE may return to enter 506 into the sleep mode and does not monitor other OFDM symbols that do not include the ACK/NAK.

Figure 6:
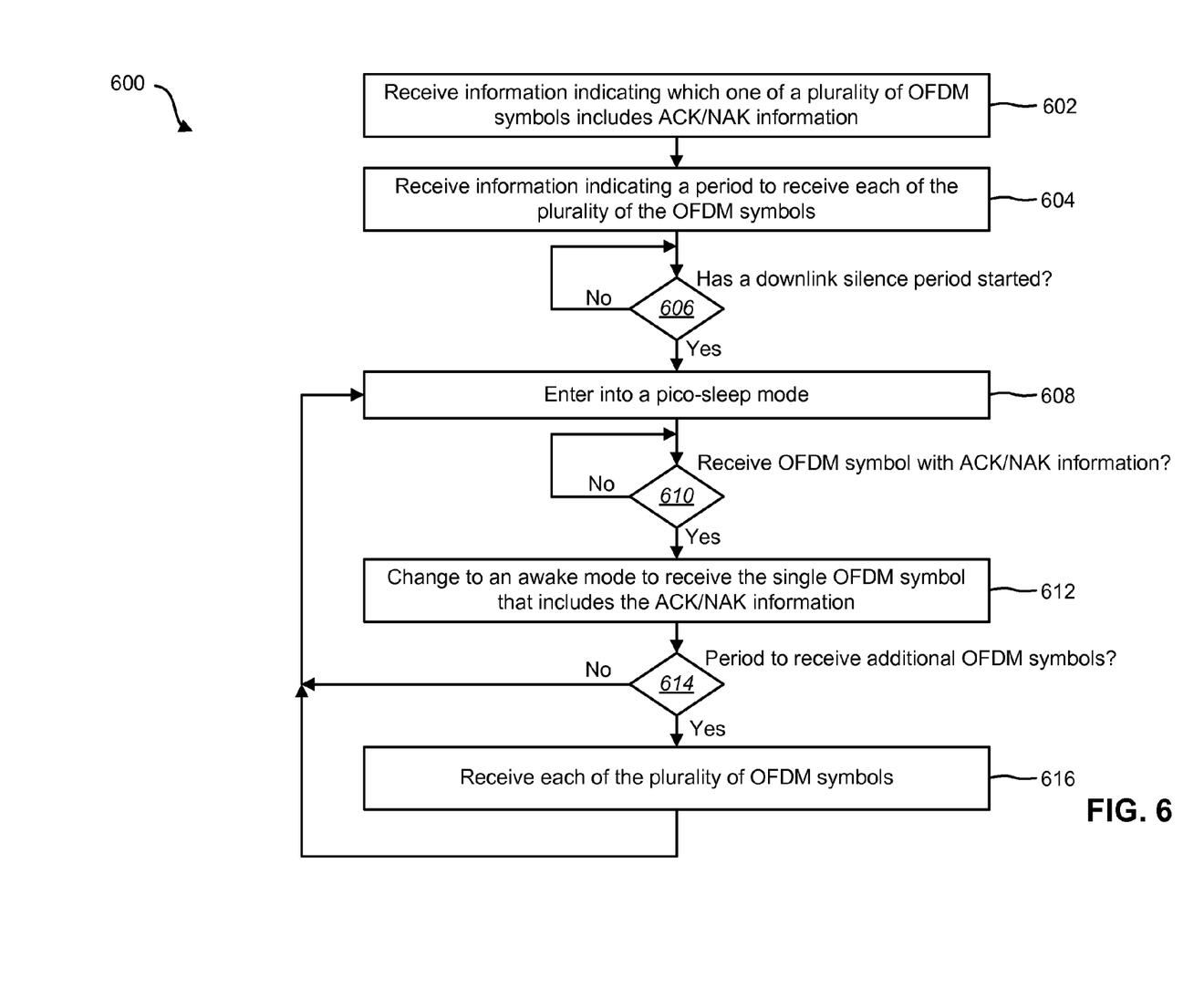
FIG. 6 is a flow diagram illustrating a further embodiment of a method for conserving the power supply of the user device.

FIG. 6 is a flow diagram illustrating a further embodiment of a method 600 for conserving the power supply of a user device (i.e., a UE). Information may be received 602 that indicates which one of a plurality of OFDM symbols includes ACK/NAK information. In addition, information may be received 604 that indicates a time period in which each of the OFDM symbols are to be received. The information regarding the location of the ACK/NAK information as well as the information regarding the time period to receive all the OFDM symbols may be received during a VoIP call setting-up phase. The call setting-up phase may be the phase during which the UE is registering with the eNB before transmissions are sent or received. The information may be received 602, 604 through RRC signaling from the eNB.

In another embodiment, the information may be determined or generated at the UE, rather than being sent through RRC signaling from the eNB. For example, if OFDM symbol location which includes ACK/NAK bit is related to UL resource (i.e., time and frequency location), there is no need to send explicit signaling (e.g., RRC signaling).

A determination 606 is made as to whether a DL silence period has started. If the DL silence period has not started, the method 600 enters a repeating loop until the DL silence period has begun. After the DL silence period has started, the UE enters 608 into a pico-sleep mode. The pico-sleep mode may include powering down the majority of applications and functions available on the UE. The pico-sleep mode is utilized to consume a minimum amount of power as possible from the power source of the UE. A determination 610 is made as to whether the OFDM symbol that includes the ACK/NAK information is received. If the OFDM symbol with the ACK/NAK is not received, the UE remains in the pico-sleep mode. When the OFDM symbol that includes the ACK/NAK is received, the UE changes 612 to an awake mode in order to receive the single OFDM symbol and ACK/NAK information.

Once the UE receives the ACK/NAK information, a determination 614 is made as to whether the UE is in the time period to receive additional OFDM symbols. For example, the additional OFDM symbols may include IP packets and other PDCCH information that may be received by the UE. If the UE is not in the time period to receive additional OFDM symbols, the UE may return to enter 608 into the pico-sleep mode and does not monitor other OFDM symbols that do not include the ACK/NAK.

However, if the UE is in the time period to receive additional OFDM symbols, the UE remains in the awake state and receives 616 each of the plurality of OFDM symbols and the information associated with these symbols. The OFDM symbols may be transmitted to the UE over the PDCCH. After the UE receives the information included in the remaining OFDM symbols, the UE may return to enter 608 into the pico-sleep mode.

Figure 7:
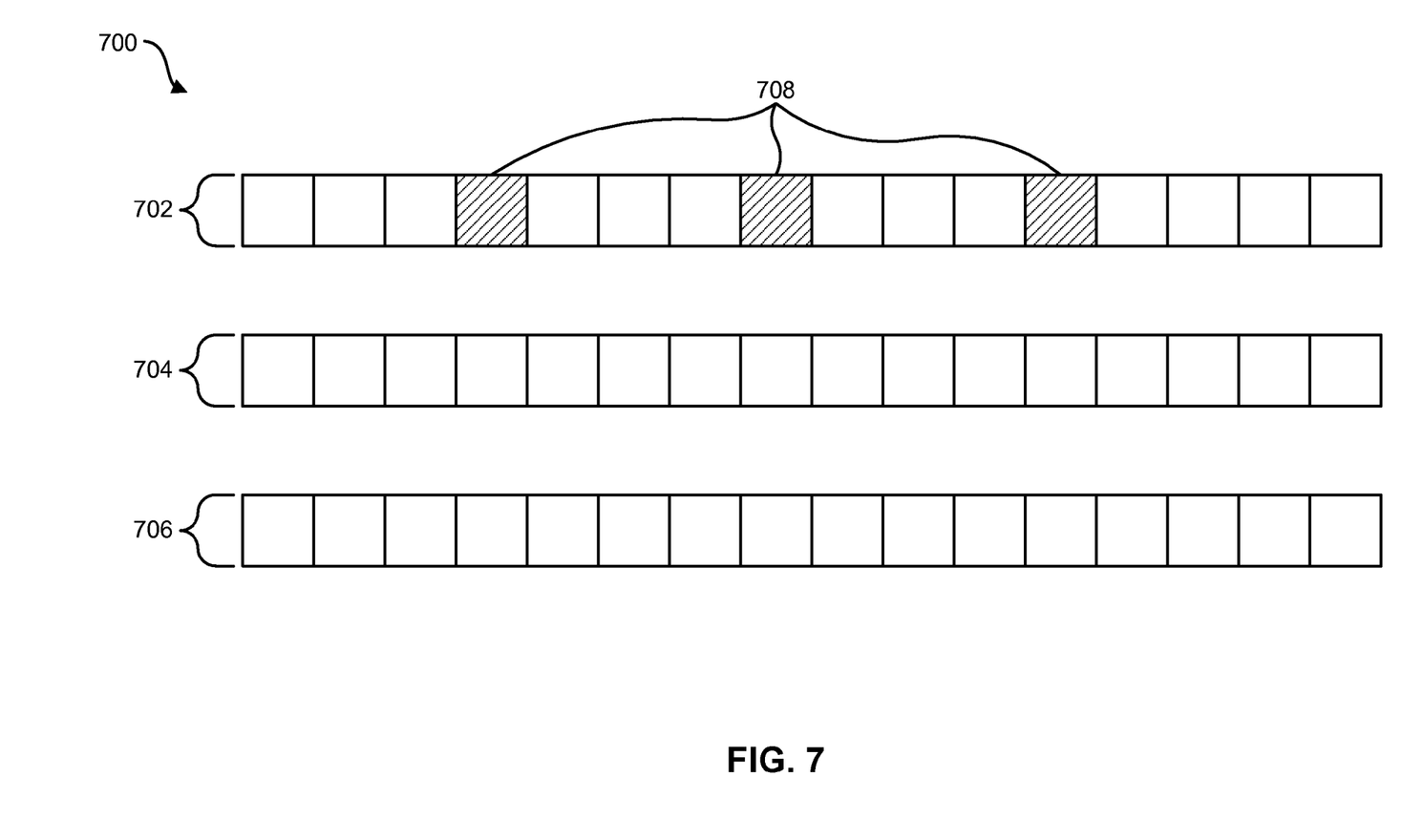
FIG. 7 is an embodiment of a plurality of Orthogonal Frequency Division Multiplexing (OFDM) symbols.

FIG. 7 is an embodiment 700 of a plurality of OFDM symbols 702, 704, 706. A first OFDM symbol 702 may include ACK/NAK information 708 for a certain UE. The ACK/NAK information 708 for the certain UE may only be included in a single OFDM symbol. A UE in a pico-sleep mode may only monitor the OFDM symbol that includes the ACK/NAK information 708 during a DL silence period. The UE may change from the pico-sleep mode to an awake mode in order to receive the ACK/NAK information 708. After receiving the ACK/NAK information 708 from the first OFDM symbol 702, the UE may return to the pico-sleep mode and ignore the remaining OFDM symbols 704, 706.

The ACK/NAK may be inserted into only a single OFDM symbol because of the persistent scheduling of VoIP and the blind decoding in the UL. In some instances, there may be a need to include UL modulation and coding schemes (MCS) information in the PDCCH. However, the pico-sleep mode may still be implemented because the granularity of such MCS changes in UL transmissions may be less than once per 40 ms. In other embodiments, additional PDCCH information may be inserted into the single OFDM symbol that includes the ACK/NAK.

Figure 8:
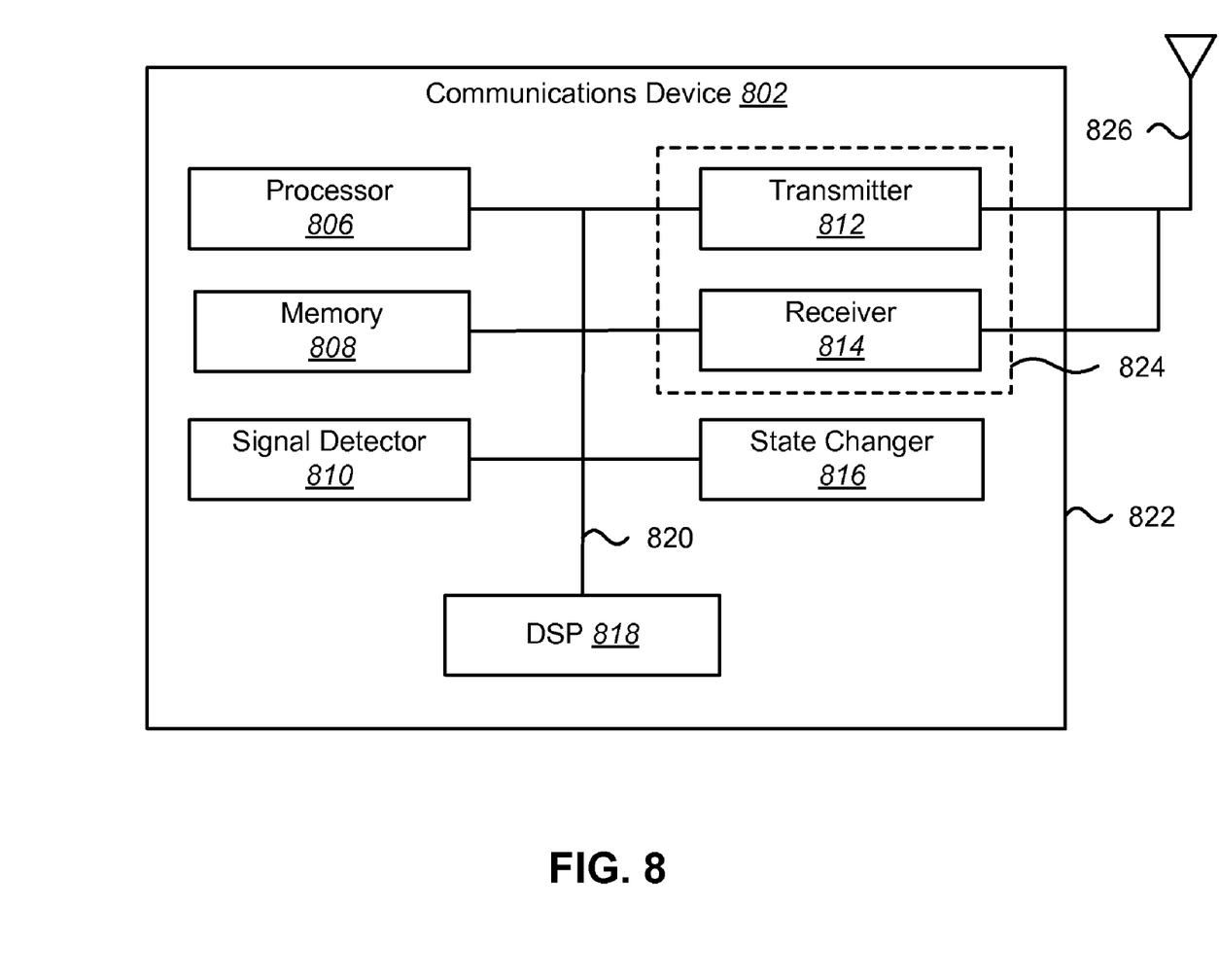
FIG. 8 illustrates various components that may be utilized in a communications device.

FIG. 8 illustrates various components that may be utilized in a communications device 802, such as a UE, in accordance with one embodiment. The device 802 includes a processor 806 which controls operation of the device 802. The processor 806 may also be referred to as a CPU.

Memory 808, which may include both read-only memory (ROM) and random access memory (RAM), provides instructions and data to the processor 806. A portion of the memory 808 may also include non-volatile random access memory (NVRAM). The memory 808 may include any electronic component capable of storing electronic information, and may be embodied as ROM, RAM, magnetic disk storage media, optical storage media, flash memory, on-board memory included with the processor 806, EPROM memory, EEPROM memory, registers, a hard disk, a removable disk, a CD-ROM, etc. The memory 808 may store program instructions and other types of data. The program instructions may be executed by the processor 806 to implement some or all of the methods disclosed herein.

The device 802 may also include a housing 822 that includes a transmitter 812 and a receiver 814 to allow transmission and reception of data between the communications device 802 and a remote location. The transmitter 812 and receiver 814 may be combined into a transceiver 824. An antenna 826 is attached to the housing 822 and electrically coupled to the transceiver 824.

The communications device 802 also includes a signal detector 810 used to detect and quantify the level of signals received by the transceiver 824. The signal detector 810 detects such signals as total energy, power spectral density and other signals.

A state changer 816 of the device 802 controls the state of the device 802 based on a current state and additional signals received by the transceiver 824 and detected by the signal detector 810. The device 802 is capable of operating in any one of a number of states.

The various components of the device 802 are coupled together by a bus system 820 which may include a power bus, a control signal bus, and a status signal bus in addition to a data bus. However, for the sake of clarity, the various busses are illustrated in FIG. 8 as the bus system 820. The device 802 may also include a digital signal processor (DSP) 818 for use in processing signals.

Figure 9:
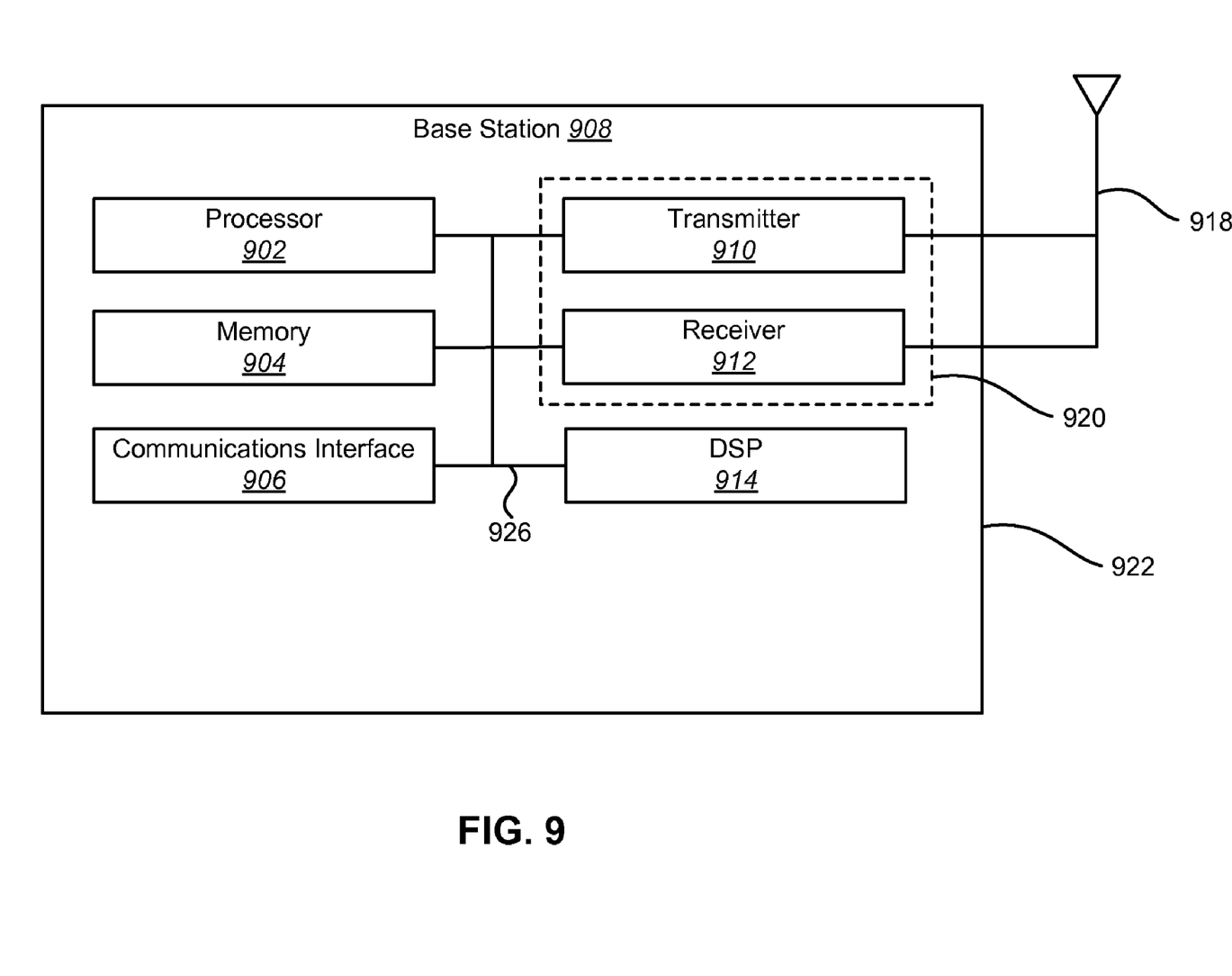
FIG. 9 illustrates various components that may be utilized in a base station.

FIG. 9 is a block diagram of a base station 908 in accordance with one embodiment of the disclosed systems and methods. The base station 908 may be an eNB, a base station controller, a base station transceiver, etc. The base station 908 includes a transceiver 920 that includes a transmitter 910 and a receiver 912. The transceiver 920 may be coupled to an antenna 918. The base station 908 further includes a digital signal processor (DSP) 914, a general purpose processor 902, memory 904, and a communication interface 906. The various components of the base station 908 may be included within a housing 922.

The processor 902 may control operation of the base station 908. The processor 902 may also be referred to as a CPU. The memory 904, which may include both read-only memory (ROM) and random access memory (RAM), provides instructions and data to the processor 902. A portion of the memory 904 may also include non-volatile random access memory (NVRAM). The memory 904 may include any electronic component capable of storing electronic information, and may be embodied as ROM, RAM, magnetic disk storage media, optical storage media, flash memory, on-board memory included with the processor 902, EPROM memory, EEPROM memory, registers, a hard disk, a removable disk, a CD-ROM, etc. The memory 904 may store program instructions and other types of data. The program instructions may be executed by the processor 902 to implement some or all of the methods disclosed herein.

In accordance with the disclosed systems and methods, the antenna 918 may receive reverse link signals that have been transmitted from a nearby communications device 802, such as a UE. The antenna 918 provides these received signals to the transceiver 920 which filters and amplifies the signals. The signals are provided from the transceiver 920 to the DSP 914 and to the general purpose processor 902 for demodulation, decoding, further filtering, etc.

The various components of the base station 908 are coupled together by a bus system 926 which may include a power bus, a control signal bus, and a status signal bus in addition to a data bus. However, for the sake of clarity, the various busses are illustrated in FIG. 9 as the bus system 926.

The present systems and methods described herein relate to 3GPP LTE systems. However, the present systems and methods may be utilized for other OFDM communication systems, for example IEEE 802.16m.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the embodiments disclosed herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the embodiment that is being described, the order and/or use of specific steps and/or actions may be modified without departing from the scope of the claims.

While specific embodiments have been illustrated and described, it is to be understood that the claims are not limited to the precise configuration and components illustrated above. Various modifications, changes and variations may be made in the arrangement, operation and details of the embodiments described above without departing from the scope of the claims.

What is claimed is:

1. A method for conserving the power supply of an Orthogonal Frequency Division Multiplexing (OFDM) communications device, comprising:
   obtaining the location of a bit of information within one of a plurality of symbols;
   determining if a silence period on a downlink of the communications device has started;
   entering into a sleep mode;
   monitoring the one symbol that includes the bit of information; and
   returning to the sleep mode.

2. The method of claim 1, wherein the bit of information comprises an acknowledgment/non-acknowledgment (ACK/NAK) bit.

3. The method of claim 1, wherein the plurality of symbols comprises Orthogonal Frequency Division Multiplexing (OFDM) symbols.

4. The method of claim 1, further comprising receiving a time period information to enable monitoring each of the plurality of symbols.

5. The method of claim 4, further comprising remaining in an awake mode to monitor each of the plurality of symbols based on the time period information.

6. The method of claim 4, wherein the time period is less than 160 milliseconds.

7. The method of claim 1, wherein the location of a bit of information within one of a plurality of symbols is transmitted by an Evolved NodeB to the OFDM communications device.

8. A communications device in an Orthogonal Frequency Division Multiplexing (OFDM) system, wherein the communications device is configured to conserve its power supply, the communications device comprising:
   a processor;
   memory in electronic communication with the processor;
   instructions stored in the memory, the instructions being executable to:
      obtain the location of a bit of information within one of a plurality of symbols;
      determine if a silence period on a downlink of the communications device has started;
      enter into a sleep mode;
      monitor the one symbol that includes the bit of information; and
      return to the sleep mode.

9. The communications device of claim 8, wherein the bit of information comprises and acknowledgment/non-acknowledgment (ACK/NAK) bit.

10. The communications device of claim 8, wherein the plurality of symbols comprises Orthogonal Frequency Division Multiplexing (OFDM) symbols.

11. The communications device of claim 8, wherein the instructions are further executable to receive a time period information to enable monitoring each of the plurality of symbols.

12. The communications device of claim 11, wherein the instructions are further executable to remain in an awake mode to monitor each of the plurality of symbols based on the time period information.

13. The communications device of claim 11, wherein the time period is less than 160 milliseconds.

14. The communications device of claim 8, wherein the location of a bit of information within one of a plurality of symbols is transmitted by an Evolved NodeB to the communications device.

15. A base station that is configured to inform a communications device the location of a bit of information, the base station comprising:
- a processor;
- memory in electronic communication with the processor;
- instructions stored in the memory, the instructions being executable to:
  - provide n Orthogonal Frequency Division Multiplexing (OFDM) symbols to send an acknowledgment/non-acknowledgment (ACK/NAK) bit per subframe, wherein n is a natural number greater than one;
  - insert the ACK/NAK bit for the communications device into one of the OFDM symbols, wherein at least one other OFDM symbol does not include an ACK/NAK bit; and
  - inform the communications device which OFDM symbol includes the ACK/NAK bit.

16. The base station of claim 15, wherein Radio Resource Control (RRC) signaling is used to inform the communications device which OFDM symbol includes the ACK/NAK bit.

17. The base station of claim 15, wherein the OFDM symbols transmit a Physical Downlink Control Channel (PDCCH), a Physical Hybrid Automatic Request Indicator Channel (PHICH) and a Physical Control Format Indicator Channel (PCFICH).

18. A computer-readable medium comprising executable instructions for:
- obtaining the location of a bit of information within one of a plurality of Orthogonal Frequency Division Multiplexing (OFDM) symbols;
- determining if a silence period on a downlink of the communications device has started;
- entering into a sleep mode;
- monitoring the one symbol that includes the bit of information; and
- returning to the sleep mode.

* * * * *